March 21, 1939.  F. STARK  2,151,055
THREE-DIMENSION PICTURE DEVICE
Filed May 24, 1938
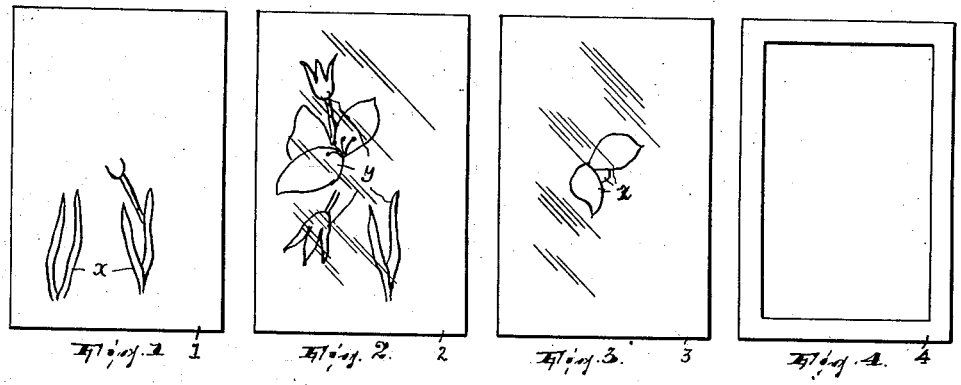
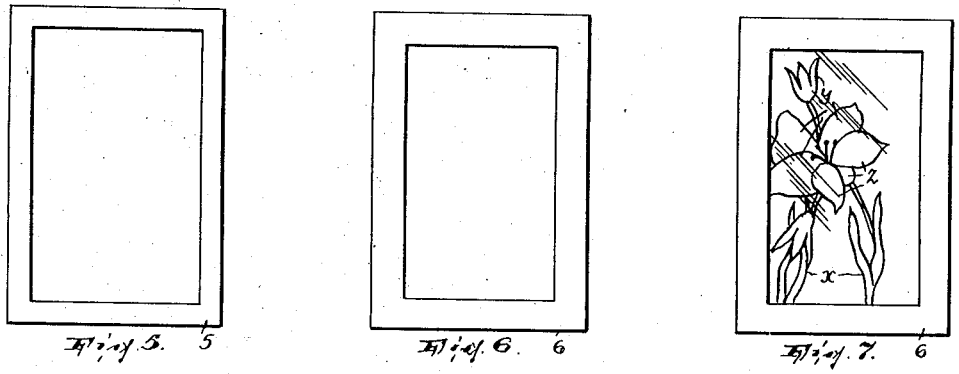
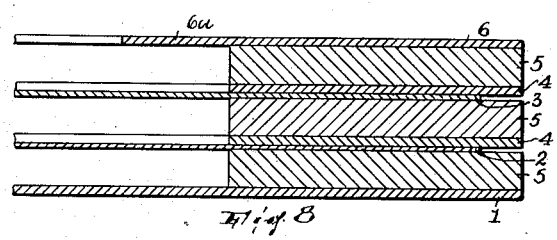
INVENTOR,
Fred Stark,
BY
ATTORNEY.

Patented Mar. 21, 1939

2,151,055

UNITED STATES PATENT OFFICE 2,151,055

THREE-DIMENSION PICTURE DEVICE

Fred Stark, Hawthorne, N. J.

Application May 24, 1938, Serial No. 209,659

3 Claims. (Cl. 41—22)

This invention relates to the art of three-dimension picture devices in which a part of the picture is developed on a backing and another part or parts is or are developed on a transparent sheet or sheets arranged forward of and in spaced relation to the backing.

I aim to provide a device of this kind which shall include a stable frame and be unitary in character. Suppose, with the backing having its picture part displayed thereon, there is only one transparent sheet with its pictures part. In such case, according to this invention there will be provided two apertured or endless frame elements, hereinafter termed spacer-frames, and these, the sheet and backing will be secured together in laminated arrangement and with the spacer-frames alternating with the sheet and backing. If there is to be another transparent sheet having its part of the picture this will be laid on the frontal one of the two spacer-frames with another spacer-frame laid on it. In order to avoid attracting the eye of the observer from the picture to the structure of the frame as viewed from its inner margin and also augment the three-dimension illusion, I provide the frame with an inwardly projecting flange of light-obstructing (as opaque) material which is forward of the elements having the picture parts.

In the drawing, in which the first seven figures are front elevations,

Figs. 1, 2 and 3 respectively show the backing and two transparent sheets having parts of the picture proper developed thereon;

Figs. 4, 5 and 6 respectively show a carrier-frame or marginal support, a spacer-frame and a mat-frame;

Fig. 7 shows the complete picture device; and

Fig. 8 is a fragmentary section view of the picture device.

Having a planiform backing 1 of opaque material a part $x$ of the picture proper is developed thereon in any way, as by printing. On a transparent sheet 2 another part $y$ of the picture proper is developed and, in this example, on another transparent sheet 3 another part $z$ of the picture proper is developed. The number of transparent sheets carrying parts of the picture proper is of course immaterial. The sheets such as 2 and 3 may be of any flexible transparent material, as Celluloid or Cellophane, but if it is quite thin or film-like and so disposed to curl or wrinkle it may be cemented to a carrier-frame or marginal support, such as 4.

5 is an apertured spacer frame. This is to provide for distance or spacing between any two parts of the picture proper, to contribute, with another or other such spacer-frames, to the appearance of depth or thickness of the picture frame and also simulate a conventional frame, and to give the device ample stability, it being observed that the element formed by a sheet 2 or 3 or the unit formed by either of them and a carrier-frame 4 is relatively thin so as to facilitate if not make possible the printing or other development of the picture-part thereon.

6 is a mat-frame.

Assume that, as in the example, the picture device is to present three picture parts, as one afforded by the backing and the other two by the sheets 2 and 3; also that each sheet 2 or 3 has been made to form a unit with a carrier frame 4. The several constituent parts exist as shown in Fig. 8, or with a unit 2—4 spaced from the backing 1 by a spacer-frame; the unit 3—4 spaced from unit 2—4 by a spacer-frame; and the mat-frame (at the front) spaced from unit 3—4 by another spacer frame. The several parts may be secured together in any way, as by cementing them together.

It is contemplated by this invention not merely to attain a three-dimension picture effect but to produce a unitary device of which a stable frame for the picture shall be a part, such frame being composed of endless frame elements, to wit, composed of the apertured spacer-frames herein shown, and preferably of such spacer-frames and mat-frame. In the preferred form the marginal portion of the device, as viewed edgewise, should be without extensions or slot-like openings or crevices and should otherwise simulate a conventional picture frame when correspondingly viewed. Hence the several frames 4 and 5 and also 6 in this example preferably have the same outer marginal form and dimensions as the backing 1, their outer margins being here all cut to the same plane and hence flush with each other. This is obviously not necessary with respect to the sheets 2 and 3, if they are of film-like thickness; but of course their margins should not in the completed device project beyond the outer margins of the frames 4 and 5. In defining the frame elements 4 and 5 as "endless" I do not limit myself to their being each an integral structure, for each may of course be in sections composing such an endless frame.

The width of any side of the mat-frame is greater than that of the corresponding sides of the spacer-frames; in other words, its inner margin all around projects inwardly further than the inner margins of the spacer-frames. This is to hide the spacer-frames at the inner margin of the frame and to augment the three-dimension effect produced by the picture.

Three-dimension picture devices have been heretofore proposed comprising an opaque backing having a part of the picture thereon, one or more transparent sheets having another part or parts thereon and spacing means between the foregoing parts; and it has also been proposed to provide a kind of frame as an integral part of the completed device. But so far as I am aware it has not been proposed to provide a framed three-dimension picture device in which the elements of the frame were formed by endless frame elements, as my spacer-frames, in laminated relation to the backing and the one or more planiform elements, as 2 or 3, or 2—4 or 3—4, which, with the backing, provide the picture parts.

The spacer-frames, mat-frame and also carrier-frames 4 when used may all be composed of card-board or the like stiff paper material.

The mat-frame, by projecting inwardly to form an inward marginal flange, as 6a, conceals those portions, as 5, of the frame which space the backing and sheet elements and augments the three-dimension illusion. In other words, given means, extending around the picture and providing a frame for the device, having a portion or portions spacing the margins of the elements which carry the picture parts, according to my invention said means includes an inward non-transparent flange relatively forward of the frontal one of said elements and projecting inwardly further than such portion or portions.

Having thus fully described my invention, what I claim is:

1. The herein described three-dimension picture device including a planiform backing element on one side of which a part of the picture is presented, a transparent sheet element opposed to and spaced from said side of the first element and on which another part of the picture is presented, and means forming with the margins of the backing and sheet elements a frame for the picture and including apertured planiform spacer-frame elements forming layers alternating with the backing and sheet elements and of appreciably greater thickness than the latter element, the backing, sheet and spacer-frame elements being all secured together as a unitary structure, each element being of substantially uniform thickness throughout its whole extent.

2. The herein described three-dimension picture device including a planiform backing element on one side of which a part of the picture is presented, a transparent sheet element opposed to and spaced from said side of the first element and on which another part of the picture is presented, and means forming with the margins of the backing and sheet elements a frame for the picture and including apertured planiform spacer-frame elements forming layers alternating with the backing and sheet elements and of appreciably greater thickness than the latter element and an apertured mat-frame element superimposed on said layers and projecting inwardly over the backing element further than the spacer-frame elements, said backing, sheet, spacer-frame and mat-frame elements being all secured together as a unitary structure, each element being of substantially uniform thickness throughout its whole extent.

3. The herein described three-dimension picture device including a planiform backing element having a part of the picture presented on one side thereof, a transparent sheet element having another part of the picture presented thereon and being opposed to and spaced from said side of the backing element, and means, extending around the picture and providing a frame for the device, having a portion spacing the margins of said elements, said means including an inward non-transparent flange relatively forward of the sheet element and projecting inwardly further than said portion.

FRED STARK.